Aug. 11, 1964 R. T. KENNEDY 3,143,759
FLAME SHIELD FOR HANDLE
Filed June 7, 1962 2 Sheets-Sheet 1

INVENTOR.
Richard T. Kennedy
BY

Aug. 11, 1964    R. T. KENNEDY    3,143,759
FLAME SHIELD FOR HANDLE
Filed June 7, 1962    2 Sheets-Sheet 2

INVENTOR.
Richard T. Kennedy
BY

United States Patent Office 3,143,759
Patented Aug. 11, 1964

3,143,759
FLAME SHIELD FOR HANDLE
Richard T. Kennedy, Oak Lawn, Ill., assignor to Ekco Products Company, Chicago, Ill., a corporation of Delaware
Filed June 7, 1962, Ser. No. 200,863
1 Claim. (Cl. 16—116)

The present invention relates to flame shields for use with culinary receptacle handle mountings for protecting the handle from damage by hot up-drafts or flames along the wall of the pan to which the handle is joined.

An object of this invention is to provide a shield or guard for the purpose indicated which incorporates novel features of construction and attachment.

Another object of this invention is to provide a shield or guard which is neat in appearance, strong and economical to manufacture.

With the above and other objects in view, as will be apparent, this invention consists in the construction, combination and arrangement of parts, all as hereinafter more fully described, claimed and illustrated in the accompanying drawings, wherein:

Figure 1:
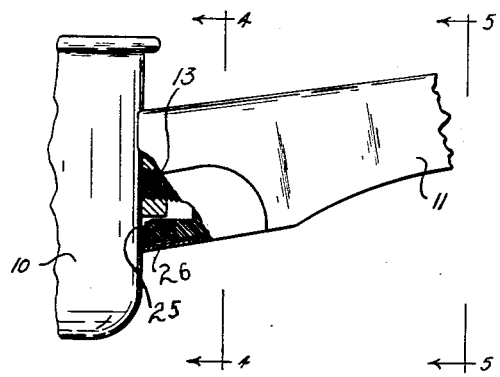
FIG. 1 is a fragmentary view in side elevation of a handle assembly incorporating a flame guard representing one embodiment of the present invention.

In the drawings, reference numeral 10 represents a pan to which a handle 11 of plastic composition is secured. A nut 12 welded to the side wall of the pan 10 has a threaded bore 13 which receives the threads of a bolt or screw 14. The forward end of handle 11 is recessed to provide hollow neck portion 15 which skirts the nut 12 so as to enclose the area occupied by the nut when the handle 11 engages the side wall of the pan 10 along the forward edge of said neck portion 15.

A rearwardly facing shoulder 16 formed in the underside of the handle 11 and the area of the handle enclosed by said neck portion 15 in axial alignment with the threaded bore 13 of the nut 12 are joined by a bore 17 which receives the bolt or screw 14. The handle is accordingly rigidly secured to the pan 10 under clamping pressure applied between the head 18 at the rear end of the screw 14 and the surface of the shoulder 16 opposite said head as the screw 14 is threaded forwardly into the nut 12.

Figure 2:
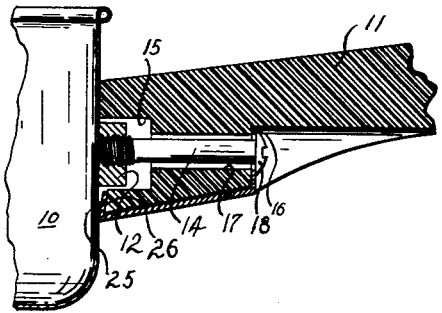
FIG. 2 is a central longitudinal vertical section of FIG. 3.
Figure 3:
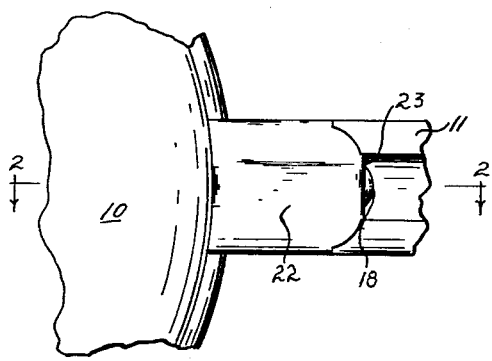
FIG. 3 is a bottom plan view of FIG. 1.
Figure 4:
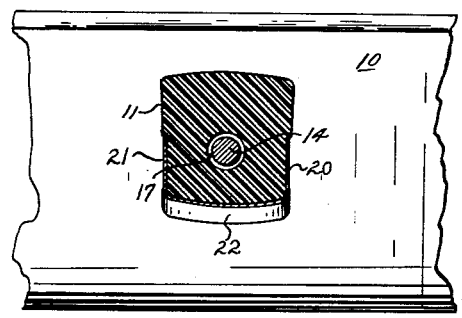
FIG. 4 is a section taken along line 4—4 of FIG. 1.
Figure 5:
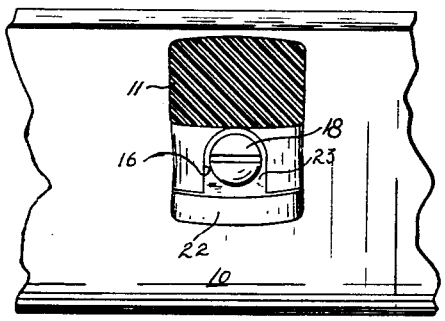
FIG. 5 is a view taken along line 5—5 of FIG. 1.
Figure 6:
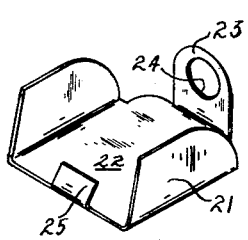
FIG. 6 is a perspective view of the flame guard shown in FIGS. 1 to 5 inclusive, when removed from the handle.

A metal shield for protecting the handle 11 against damage by hot up-drafts or flames along the wall of the pan 10, as shown in FIGS. 1 to 6, includes a pair of upright side walls 20 and 21 which are joined by a base wall 22 to define a channel of such width as to have snug fit with the underside of the handle 10 and along opposite side wall surfaces of the handle extending upwardly from said underside of the handle. The surfaces of the handle thus overlapped by the base wall and side walls of the shield are preferably recessed so as to maintain the outer surface of said base wall and side walls of the shield substantially flush with the exposed surfaces of the handle bordering said shield. The rear end of the base wall 22 is extended rearwardly of the base wall portion within the confines of the side walls 20 and 21 and said rearward extension of the base wall terminates in an integral upwardly bent flange 23 having overlapping engagement with the shoulder 16. A screw hole 24 is provided in the flange 23 in axial alignment with the bore 17 in the handle 10 whereby the screw 14 has entry to the bore 17 via said hole 24 in the flange 23. Thus in establishing a rigid connection of the handle with the pan 10 via the screw 14, the flange 23 is likewise secured against the shoulder 16 under pressure of the head 18 as the screw 14 is tightened to fasten the shield in fixed relation to the handle. The shield is further trapped against separation from the handle along the wall of the pan by means of an inwardly and upwardly bent tab 25 forming an integral forward extension of the base wall 22 and a slot 26 provided in the front end surface of the handle overlapped by said tab 25. The slot permits the tab to occupy a position in depressed relation to the surfaces of the handle which straddle said slot so as to present said surfaces of the handle and the surface of the tab exposed along said surfaces in flush relation, thereby avoiding any gap between the pan wall and the surfaces of the handle opposite said wall.

Figure 7:
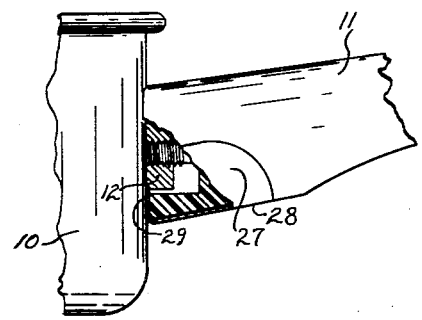
FIG. 7 is a fragmentary view in side elevation representing a modified form of flame guard.
Figure 8:
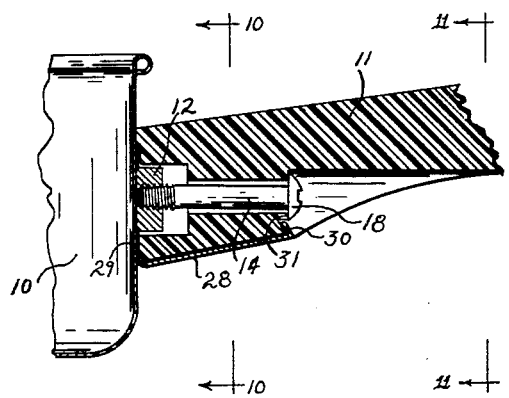
FIG. 8 is a central longitudinal vertical view taken along line 8—8 of FIG. 9.
Figure 9:
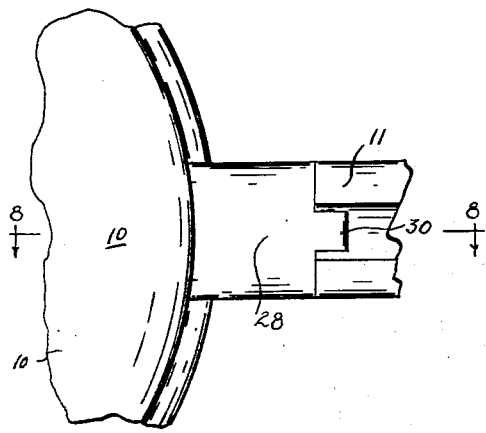
FIG. 9 is a bottom plan view of FIG. 7.
Figure 10:
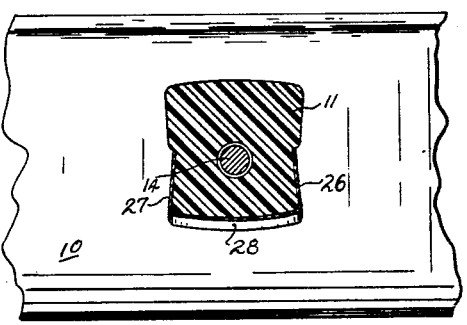
FIG. 10 is a section taken along line 10—10 of FIG. 8.
Figure 11:
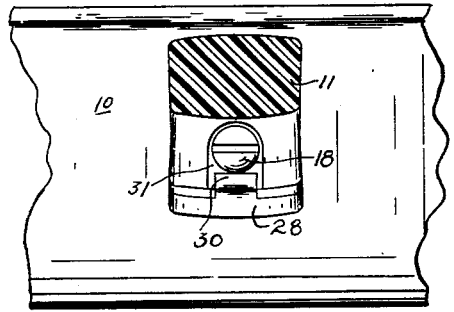
FIG. 11 is a view taken along line 11—11 of FIG. 8.
Figure 12:
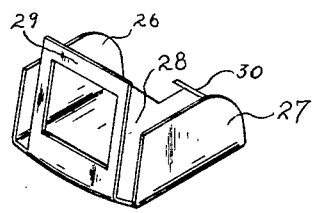
FIG. 12 is a perspective view of the modified flame guard shown in FIGS. 7 to 11 inclusive when removed from the handle.

In the form of shield shown in FIGS. 7 to 12 inclusive, a pair of upright side walls 26 and 27 are joined by a base wall 28 and the front end of the base wall 28 is defined by an integral upright flange 29 having an open area in axial alignment with the nut 12 on the wall of the pan 10 so as to allow the flange 29 to slide over the nut and thereby having abutment with the wall of the pan along the forwardly facing surface of the flange 29. The front end of the handle 11 is depressed along lines matching the peripheral contour of the flange 29 so as to skirt the flange 29 and apply pressure against the flange 29 in the direction of the pan 10 as the screw 14 is tightened in the nut 12 to join the pan 10, handle 11 and flange 29 in fixed relation. In order to avoid unintentional loosening of the shield along its rear end, an inwardly and forwardly bent tab 30 is provided via an integral rearward extension of the base wall 28, and a recess formed in the surface of the handle overlapped by said tab 30 defines an upwardly and forwardly inclined shoulder 31 against which the tab 30 is trapped against withdrawal from the handle. The surfaces of the handle 11 overlapped by the side walls 26 and 27 and base wall 28 are preferably recessed so as to maintain the exposed surfaces of the handle bordering said walls in smooth continuous relation to the outer surfaces of the shield bordered thereby.

If desired, a washer may be provided on the screw 14 for engagement with the surface of the shoulder 16 under pressure of the screw head 18.

What is claimed is:

A flame shield for use with a culinary receptacle handle mounting, wherein said mounting includes a handle and fastening means rigidly joining said handle to the outer wall of said receptacle, including a screw having passage through a bore in the handle extending lengthwise of a line along which the handle projects from said receptacle, said shield comprising a metal body having a pair of upright side walls joined by a base wall to define a channel of such width as to have snug fit with the underside of said handle and opposite side walls thereof extending upwardly from said underside along lines extending lengthwise of the line along which the handle projects from said receptacle, and means effective to secure said shield in fixed relation to said handle including a flange integral with and extending upwardly from said base wall of the shield and engaged between a head at the rear end of said screw and the surface of the handle surrounding said bore and facing said head of the screw and a second tab integral with and extending upwardly from said base wall of the shield and overlapping an end portion of the handle facing said receptacle, said end portion of the handle so overlapped by said second tab being recessed to receive and have interlocking engagement with said second tab and to allow said end portion of the handle bordering said recess to have snug engagement with the surface of the receptacle opposite thereto.

References Cited in the file of this patent

UNITED STATES PATENTS

| | | |
|---|---|---|
| 1,492,251 | Kolp | Apr. 29, 1924 |
| 1,851,136 | Seghers | Mar. 29, 1932 |
| 1,988,751 | Seghers | Jan. 22, 1935 |
| 2,787,805 | Kraemer et al. | Apr. 9, 1957 |